Aug. 6, 1935.  A. A. SCARLETT  2,010,110
SELF PROPELLED PLANTER
Filed May 20, 1931  3 Sheets-Sheet 1

Inventor.
Arthur A. Scarlett
By H.P. Doolittle
Atty.

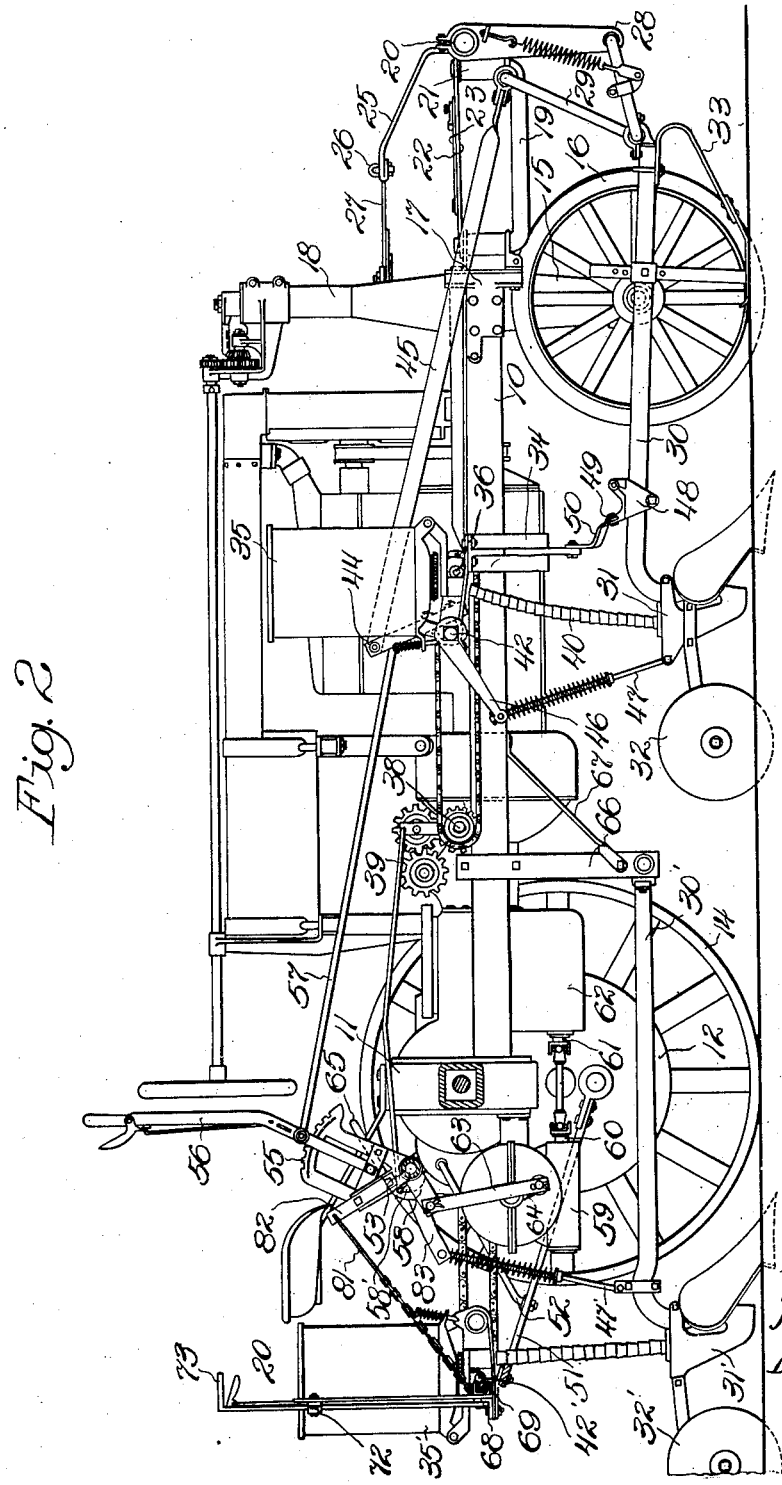

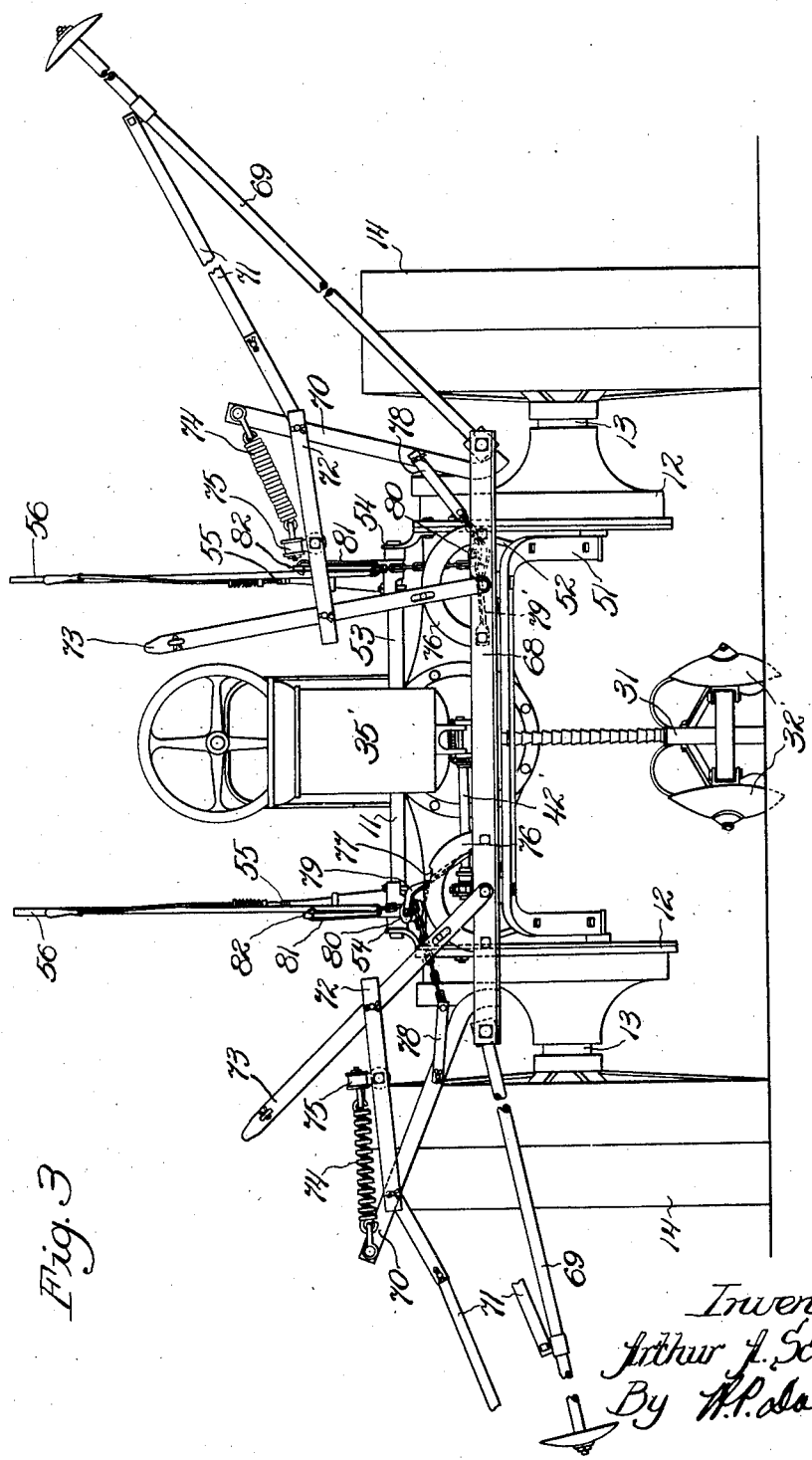

Patented Aug. 6, 1935

2,010,110

UNITED STATES PATENT OFFICE 2,010,110

SELF-PROPELLED PLANTER

Arthur A. Scarlett, Hamilton, Ontario, Canada, assignor, by mesne assignments, to International Harvester Company, Chicago, Ill., a corporation of New Jersey Application May 20, 1931, Serial No. 538,701

13 Claims. (Cl. 97—230)

This invention relates to a tractor planter.

More specifically, it relates to such an implement adapted to be mounted on and operated by a tractor.

A principal object of the invention is to provide means for floatingly attaching soil engaging implements to a tractor for vertical movement in intersecting planes and for lowering and lifting said implements into and out of operative positions.

Another object is to provide means for lifting marking attachments simultaneously with the lifting of the seed planting implements.

These and other more specific objects are accomplished by a construction such as illustrated in the accompanying drawings. The nature and advantages of the invention are set forth in detail in the description to follow.

In the drawings:

Figure 2 is a side elevation of the device shown in Figure 1, one of the rear walls of the tractor being broken away to show the power lift construction at the rear of the tractor; and Figure 3 is a rear elevation of the device shown in Figure 1.

Figure 1:
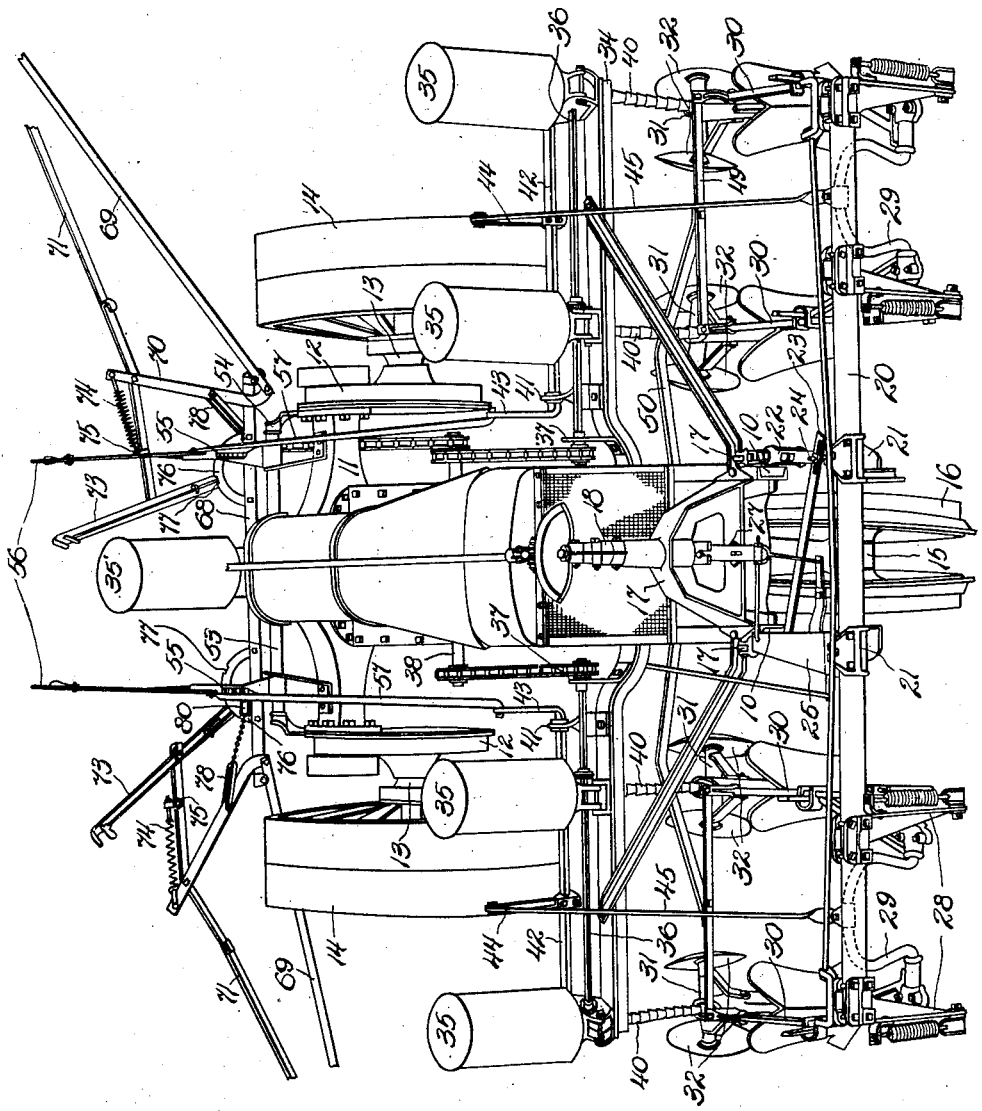
Figure 1 is a perspective of a tractor on which a combination cultivator planter embodying the invention, is mounted.

In the embodiment of the invention, as illustrated, the tractor carrying the planting attachments, comprises a narrow body having side frame members 10 supported at their rear end on a transverse axle housing 11, which extends laterally beyond both sides of the tractor body. Depending housings 12, attached at the end of the housings 11, contain gearing which drives stub axles 13, on which the drive wheels 14 are mounted. The forward end of the tractor is supported on a steering truck 15, which preferably has two closely positioned wheels 16 located centrally between the two rear traction wheels 14, the wheel arrangement being such that the machine can straddle rows of growing plants. The forward ends of the side frame members 10 are connected by a cross head 17, consisting of a single casting having a horizontally extending portion and a centrally upwardly extending tubular portion which provides bearings for the vertical standard 18 of the truck 15, which is thus made capable of being turned to steer the machine. In the construction illustrated means attached to the standard 18, are provided for laterally moving certain portions of the forwardly positioned carrying structure, to be hereinafter described.

As best shown in Figure 2, forwardly projecting pivot arms 19 are journalled on vertical axes in brackets rigidly secured to the cross head 17. Said arms support a transversely extending implement supporting beam 20, the arms being pivotally connected on vertical axes to brackets 21 secured to said member. Brace bars 22 are employed to supplement the arms 19. One of these bars supports a diagonally extending control bar 23, which is provided at one end with a slot through which a pin 24 extends. The slot limits the amount of lateral movement of the beam 20 when the connection for shifting the beam with the steering truck is utilized. An upwardly and rearwardly extending member 25 is rigidly connected to the forward beam. A link 26 pivotally connects the member 25 with a forwardly extending member 27 secured to the steering standard 18. It will be understood that by this construction the beam 20 is shifted laterally on the arms 19 with the front truck, the amount of movement being limited by the slot in the member 23. The beam 20 is provided at laterally spaced points with downwardly extending supports 28. There are two of these supports at each side of the tractor. A peculiarly shaped arch 29 has its ends pivotally mounted at the lower end of said supports. Said arch has portions which extend rearwardly from said supports, horizontally transversely with respect to the tractor, to provide bearing surfaces, and upwardly to complete the central portion of the arch. Beams 30, pivotally mounted on the transverse portions of the arches, carry soil working implements, such as lister plows, as illustrated. At the rear of each of the beams a member 31, diagrammatically illustrated, provides for a seed depositing passage and has means for attaching the seed covering disks 32. An adjustable depth gaging shoe 33 is attached to the forward end of each of the beams 30.

A heavy rigid angle bar 34, bent down intermediate its ends to pass under the tractor engine, is rigidly secured to the tractor frame by means not shown in the drawings. Said angle bar forms a supporting structure carrying the planter units 35 and means for operating the seed dispensing mechanisms of said units. Said dispensing mechanisms may be of any conventional form such as may be operated by shafts 36 positioned below the planter units. The shafts 36 at each side of the tractor are provided with bearings adjacent the body of the tractor formed in the brackets 37 attached to the angle bar 34. Sprockets on the ends of said shafts are positioned in alignment with chain sprockets on a shaft 36, transversely mounted on the tractor frame at the rear of the engine. Said shaft is mounted in suitable bearings and is adapted to be driven by a gear train operated from the drive shaft of the tractor, extending from the engine to the rear axle housing. As shown in the drawings, a link 39 is provided for throwing the members of the gear train into and out of mesh, whereby the seeding mechanisms of the planter units may be thrown into and out of operation.

Flexible seed dispensing tubes 40 extend from the planter units to the respective seed depositing means in the members 31 positioned there below. The angle bar 34 is provided with brackets 41 which support rock shafts 42 at either side of the tractor. Adjacent the tractor the rock shafts are provided with integral lever extensions 43. Intermediate the planting units each of the shafts 42 is provided with a lever 44 which is pivotally connected with a link 45. At its other end each of the links 45 is pivotally attached to the top portion of one of the arches 29. As will be best understood by an inspection of Figure 2, a forward movement of the link 45 rotates the arch 29 and lifts the forward end of the beam 30 attached thereto.

Above each of the soil working implements the shafts 42 are also provided with a rearwardly downwardly extending lever 46. A link 47 is pivotally attached to each of said levers and to one of the members 31. Said links are constructed in the conventional manner, permitting a positive upward pull and a resilient downward pressure. It will be understood that when the shafts 42 are rotated to move the levers 46 in an upward direction the rear end of the beam 30 will be raised upwardly at the same time as the forward end thereof.

At points forwardly of the attachment of the members 31 the beams 30 are provided with brackets 48, to which spacer bars 49 are pivotally attached. Said bars maintain the earth working implements in constantly spaced relation with respect to each other. Intermediate each of the bars 49 bars 50 are pivotally attached. Said bars may be attached underneath the tractor body, to each other, or may be attached to the tractor frame, whichever is found desirable for best holding the earth working implements in the position desired.

At the rear of the tractor a draw bar 51 is pivotally attached to the depending housings 12. Said draw bar is held in an upwardly extending position by braces 52 attached thereto and to the depending housings at an upwardly located position. A rock shaft 53 is pivotally mounted in brackets 54 secured to the upper part of the housings 12. Said rock shaft carries at each side a sector 55. A hand lever 56, pivotally secured to a portion of the sector bracket, is provided with a latch for locking it in a plurality of positions with respect to the sector 55. A link 57 is connected to the lever 56 and to the lever extension 43 on the shaft 42. The construction is the same at each side of the tractor, the individual levers providing for independent adjustment of the working depth of the implements at each side of the tractor.

The rock shaft 53 is also provided with a rearwardly extending lever 58. A power lift device 59 is attached to the rear axle housing of the tractor. Said device is operated by a forwardly extending shaft 60, which is attached by means of an intermediate shaft and universal shafts to a power take-off shaft 61, which extends rearwardly from a housing 62 depending below the transmission of the tractor. A link 63 is pivotally attached to the lever 58 and to a crank 64 extending laterally from the power lift device. The power lift contains mechanism for rotating the crank 64 half revolutions, that is, from the position shown in Figure 2 to a position diametrically opposite upon engagement by the operator, and from that position back to the position shown upon being engaged a second time. A lever 65 is shown extending from a position near the operator to the power lift device. This lever is utilized for throwing the power lift device into operation.

Forwardly of the rear wheels of the tractor a support is formed for the forward end of a plow beam 30', similar to the forward plow beams 30 and positioned centrally between the two forward beams which are adjacent the tractor. The support consists of bars 66 extending vertically downwardly from the tractor frame and bracing bars 67 extending forwardly from the lower ends of the bars 66. The beam 30' carries a lister plow and a member 31' serves as a seed depositing means. Seed cover disks 32' are also attached behind the member 31'.

On a suitable bracket, rigidly secured to the draw bar 51, a planter 35' is mounted. Said planter is similar to those forwardly mounted on the tractor and includes a conventional seeding mechanism driven by a laterally extending shaft 42', as best shown in Figure 3. Said shaft is supported in a bracket and is provided with a chain sprocket which is positioned in alignment with a chain sprocket mounted on the forwardly positioned shaft 36, previously described. By this construction the forwardly positioned planter and the rearwardly positioned unit are simultaneously operated.

A transversely extending angle bar 68 is rigidly secured to the rear portion of the draw bar 51, extending laterally a considerable distance beyond the draw bar. Marker bars 69 are pivotally secured at the ends of the bar 68. Two members 70 and 71, extending from opposite ends of each marker bar 69, are secured together there above to form a triangular construction. At the meeting point of said members a link 72 is pivotally attached. Said link is also pivotally attached to a hand lever 73, which is in turn pivotally attached to the angle bar 68 extending upwardly therefrom. A spring 74 is attached to a bracket 75 at one end and to an extension of the member 70 at the other end. The bracket 75 is attached to the link 72 intermediate its ends. It will be understood that the spring 74 acts to urge the marker bar 69 to a lifted position and assists, therefore, in lifting said bar. A quadrant 76 is provided on the bar 68 with the same center as the pivot point of the lever 73. The quadrant 76 has a notch 77 near the upper portion thereof, which is engaged by a latch carried by the lever 73 when said lever is moved to lift the bar 69 to the raised position. When the bar 69 is in a lower position, as shown at the left hand side of Figure 3, the latch does not engage the quadrant, the marker bar being free to floatingly bear on the ground, being held to some extent by the spring 74. The marker structure at each side of the tractor is exactly the same. On each of the bars 70, spaced from the point of attachment of said bar with the bar 69, a link 78 is pivotally attached. Brackets 79 and 79' are attached to the angle bar 68 in slightly different positions due to the necessity of providing for the positioning of other elements. Each of said brackets carries a grooved pulley 80. Chains connected to the links 78 pass over the pulleys 80 and are connected by rods 81 to lever arms 82, mounted on the rock shaft along with the quadrants 55.

A lever arm 83, attached to the rock shaft 53 near the central portion thereof, is connected by a linkage 47' with the rear end of the beam 30'. Said linkage is exactly similar in construction and function to the forward linkages 47, previously described.

The link 39, previously described as being operative to disengage certain of the gears in the planter mechanism driving means, is attached to an arm 58' mounted on the rock shaft 53, whereby the gears are disengaged when the power lift is actuated to raise the implements out of working position.

The operation of the various elements of the embodiment of the invention, as illustrated, has been described in connection with the description of the elements thereof. It is to be particularly noted as features of this invention, that the lifting means for the forward working implements lift the forward and rear ends of the implement beams simultaneously with a substantially parallel lifting movement. It is also a feature of the invention to provide for the simultaneous lifting of the rear unit with the front units. Another important feature, as described, is the provision of a power lift operative to simultaneously lift all of the soil working implements out of operative position, at the same time disconnecting the means for driving the seeding mechanisms. Another novel feature described in detail, is the automatic lifting of the markers. When the shaft 53 is rotated forwardly, movement is transmitted through the links 81, the connecting chains, and the links 78, to lift the markers to their raised positions. As the lever 73 passes the notch 77 in the quadrant 76, the latch automatically slips into position, with the result that the marker stays in lifted position. As the markers are used alternately at opposite sides of the tractor, all that is necessary when turning at the end of the row, is to lift the lister units out of position, the marker which is down, being automatically raised and locked into position, the chain, or flexible element, in the lifting connections permitting the shaft 53 to rock without affecting the raised arm. After the turn has been completed, the marker which is to be used is dropped into working position by releasing the latch on the hand lever 73, which controls said marker. The chain acts as a lost motion connection permitting the lift to operate without affecting the marker arms if held in raised position.

Although applicant has shown in this embodiment a combination of novel features, all cooperating functionally to provide an improved planter construction, it is to be understood that his invention, as defined by the following claims, includes the various subcombinations of elements which may be utilized with improved results over the existing structures known in the art.

Applicant limits his invention only by the scope of the appended claims.

What is claimed is:

1. In a tractor planter, the combination with a tractor of planter units located at each side of the tractor forward of its traction wheels including seed depositing devices connected to the forward end of the tractor for vertical movement in planes parallel to the longitudinal axis of the tractor, transversely extending supporting means on the tractor, a laterally extending marker arm pivoted on said supporting means at each side of the tractor for vertical movement in a plane transverse to the longitudinal axis of the tractor, means for holding said arms in raised position, motor actuated lift mechanism on the tractor including a rock-shaft on the rear of the tractor, and actuating connections between said rock-shaft and the seed depositing devices and marker arms operating to lift all said parts in unison including a lost motion connection between each marker arm and the rock-shaft whereby rocking of said shaft will not affect the marker arms when held in raised position.

2. In a tractor planter, the combination with a tractor of planter units located at each side of the tractor forward of its traction wheels including seed depositing devices connected to the forward end of the tractor for vertical movement in planes parallel to the longitudinal axis of the tractor, transversely extending supporting means on the tractor, a laterally extending marker arm pivoted on said supporting means at each side of the tractor for vertical movement in a plane transverse to the longitudinal axis of the tractor, means for holding said arms in raised position, motor actuated lift mechanism on the tractor including a rock-shaft having a plurality of fixed arms thereon, actuating connections between certain of said arms and the seed depositing devices and marker arms respectively, operating to lift all said parts in unison including chain connections with the marker arms to permit said arms to rock without affecting the marker arms when in raised position.

3. A marker attachment for a tractor having a power lift actuating means, said marker attachment comprising marking bar structures, means for pivotally supporting said marking bar structures from said tractor and laterally spaced thereon, and lost motion means operatively connecting said marking bar structures to said power lift actuating means at all times whereby said marking bars may be raised or lowered upon the operation of said power lift mechanism.

4. A marker attachment for a tractor having a power lift actuating means, said marker attachment comprising a transverse support, means for connecting said support to said tractor, a marking bar structure pivotally connected to said transverse support, means operatively connected to said marking bar structure for counter-balancing said structure, lost motion means operatively connecting said marking bar structure to said power lift actuating means whereby said marking bar may be raised or lowered upon the operation of said power lift means, and latching means for locking said marking bar in raised position whereby said power lift means may be actuated without operating said marking bar.

5. A marker attachment for a tractor having a power lift actuating means, said marker attachment comprising a transverse support, means for connecting said support to said tractor, a marking bar structure pivotally connected to said transverse support, means operatively connected to said marking bar structure for counter-balancing said structure, means for manually raising and lowering said marking bar structure, means operatively connecting said marking bar structure with said power lift actuating means for raising or lowering said marker structure, said means including a lost motion means whereby said manual means may be operated to raise the marking bar when said power lift means is in lowered position thereof.

6. A marker attachment for a tractor having a power lift actuating means, said marker attachment comprising a transverse support, means for connecting said support to said tractor, marking bar structures pivotally connected to said transverse support and laterally spaced thereto, means for manually raising and lowering said marking bars, means for counter-balancing said marking bars, means for latching said marking bars in raised position, means for unlatching said latching means, and additional power lift means for raising and lowering said marking bars, said means including lost motion means operatively connecting said marking bar structures to said power lift means whereby either of said marking bars may be raised or lowered, when one of said marking bars is locked in raised position, by said power lift means or said manual means.

7. A marker attachment for a tractor having a power lift actuating means, a rockshaft mounted on said tractor and operatively connected to said power lift means, and a rearwardly extending frame member; said marker attachment comprising a transverse support removably connected to said frame member, a marking bar structure pivotally connected to said transverse support, a quadrant mounted on said support, operating means pivoted to said support and operatively connected to said quadrant, means connecting said operating means to said marking bar structure, means operatively connected to said marking bar structure for counter-balancing said structure, and lost motion means operatively connecting said marking bar structure with said rockshaft whereby said marking bar may be raised or lowered upon the operation of said power lift mechanism.

8. A marker attachment for a tractor having a power lift actuating means of the one-half revolution type clutch, and a rockshaft mounted on said tractor and operatively connected to said power lift means; said marker attachment comprising a transverse support, means for connecting said support to said tractor, marking bar structures pivotally connected to said transverse support and laterally spaced thereto, lever operating means pivoted to said support and operated from the tractor, means pivotally connecting said operating means and said marking bar structures whereby said structures may be raised or lowered by hand, means operatively connected to said marking bar structures for counter-balancing said structures, and lost motion means operatively connecting said marking bar structures with said rockshaft whereby said marking bars may be raised and lowered upon the operation of said power lift mechanism.

9. An attachment as set forth in claim 8 said attachment comprising means mounted on said transverse support for locking said marking bars in raised position, means mounted on said lever operating means whereby the marking bar desired may be released, and the lost motion device connecting the other said bar to the rockshaft permitting the first mentioned bar to be lowered while the remaining bar remains in a raised position.

10. A marker attachment for a tractor having a power lift actuating means, said marker attachment comprising marking bar structures, means for pivotally supporting said marking bar structures from said tractor and laterally spaced thereon, means mounted on said tractor for manually raising and lowering said marking bars, means for latching said marking bars in raised position, means for unlatching said latching means, and additional power means for raising and lowering said marking bars, said means including lost motion means operatively connected to said power lift means whereby either of said marking bars may be raised or lowered when one of said marking bars is locked in raised position by said power means or by the manual operating means.

11. In a tractor planter, the combination with a tractor of planter units located at each side of the tractor forward of its traction wheels including seed depositing devices connected to the forward end of the tractor for vertical movement in planes parallel to the longitudinal axis of the tractor, a marker attachment, said marker attachment comprising marking bar structures, means for pivotally supporting said marking bar structures from said tractor and laterally spaced thereon, means for driving said planter units from said tractor, power lift actuated means operated from said tractor, means for connecting said power lift actuated means to said seed depositing devices, lost motion means for connecting said marking bar structures to said power lift actuated means at all times, means for connecting said power lift means to the driving means for said planter units, and means for throwing said power lift actuated means into and out of operation whereby said marker bar structures are raised or lowered, the planter units are thrown out of or into operation upon the raising or lowering of the seed depositing devices, and the seed depositing devices are raised or lowered simultaneously upon the operation of the power lift actuated means.

12. In a tractor planter as set forth in claim 11, the aforesaid power lift actuating means having a rockshaft, the aforesaid means for connecting said power lift actuating means to said seed depositing devices comprising a plurality of laterally spaced adjusting quadrants secured to the rockshaft, and adjusting levers pivotally supported by the rockshaft and eccentric thereto, whereby the forward seed depositing devices may be independently adjusted.

13. In a tractor planter as set forth in claim 11, a planter unit located to the rear of the tractor intermediate the tractor wheels including a seed depositing device connected to the tractor for vertical movement parallel to the longitudinal axis of the tractor, means for driving said planter unit from the tractor, and means connecting the aforesaid power lift actuated means to the seed depositing device, whereby the planter unit may be thrown out of or into operation and the seed depositing device may be raised or lowered simultaneously upon the operation of the power lift actuated means.

ARTHUR A. SCARLETT.